(12) United States Patent
Takeda

(10) Patent No.: US 8,189,106 B2
(45) Date of Patent: May 29, 2012

(54) VIDEO DATA TRANSMITTING AND RECEIVING APPARATUS, AND VIDEO DATA TRANSMITTING AND RECEIVING METHOD

(75) Inventor: Hideki Takeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 485 days.

(21) Appl. No.: 12/540,524

(22) Filed: Aug. 13, 2009

(65) Prior Publication Data

US 2010/0097520 A1 Apr. 22, 2010

(30) Foreign Application Priority Data

Oct. 16, 2008 (JP) ................................. 2008-267868

(51) Int. Cl.
*H04N 7/04* (2006.01)
*H04N 7/00* (2006.01)
(52) U.S. Cl. ........................................ 348/469; 348/476
(58) Field of Classification Search .................. 348/469, 348/473, 476–479, 441; 375/240; *H04N 7/04, H04N 7/00, 7/01*
See application file for complete search history.

(56) References Cited

U.S. PATENT DOCUMENTS

2005/0047447 A1* 3/2005 Satoh et al. .................... 370/535
2009/0167941 A1 7/2009 Takeda

FOREIGN PATENT DOCUMENTS

JP 2007-13464 1/2007

* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

A video data transmitting and receiving apparatus includes a data transmitting module configured to be able to arrange video data in a first video format, into a valid data area of a first transmission format, and transmit the video data, and also to arrange video data in a second video format different from the first video format, into an effective valid data area within the valid data area of the first transmission format, and transmit the video data; and a data receiving module configured to receive the data transmitted in the first transmission format from the data transmitting module, and obtain the video data in the second video format within the valid data area. A receiver module seamlessly obtains the video data immediately after change of the video format of the video data from a transmitter module.

18 Claims, 16 Drawing Sheets

VIDEO DATA TRANSMITTING AND RECEIVING APPARATUS, AND VIDEO DATA TRANSMITTING AND RECEIVING METHOD

CROSS-REFERENCE TO RELATED APPLICATION

This application is based upon and claims the benefit of priority from the prior Japanese Patent Application No. 2008-267868 filed in Japan on Oct. 16, 2008, the entire contents of which are incorporated herein by reference.

BACKGROUND OF THE INVENTION

1. Field of the Invention

The present invention relates to a video data transmitting and receiving apparatus and a video data transmitting and receiving method configured to receive a video data signal which is superimposed with particular information and inputted.

2. Description of Related Art

Generally, in bus transmission of video data, in addition to the video data and clocks, a horizontal synchronizing signal, a vertical synchronizing signal, a field phase signal or a data enable signal may be transmitted. As such video data transmission standards, SMPTE 274M, SMPTE 296M, ITU-R BT.656 and the like are known.

In such transmission standards, one pixel of the video data per clock is transmitted from an upper left pixel within a frame or a field, in raster scan order. Moreover, the horizontal and vertical synchronizing signals are asserted in synchronization with the raster scan.

Incidentally, in ISDB (Integrated Services Digital Broadcasting) standard, various video formats have been standardized. For example, for digital terrestrial broadcasting in Japan, there are 720×480i and 720×480p as SD (Standard Definition) formats, and there are 1920×1080i, 1440×1080i, 1280×720p, 1440×1080p and the like as HD (High Definition) formats.

A transmitter module for the bus transmission changes a period and a position of the synchronizing signal to be transmitted, or a position of a valid data area, depending on the video format. In other words, a transmission format in the video transmission depends on the video format. A receiver module can extract the synchronizing signal, thereby comprehend the transmission format, and perform processes depending on the transmission format, that is, a synchronization process, a valid data extraction process and the like depending on the video format.

Moreover, a method configured to separately transmit information on change of the valid data area which is associated with change of the video format of the video data to be transmitted, by using a transmission path different from a transmission path of the video data is also conceivable. In most cases, the transmitter module or an LSI including the transmitter module, and the receiver module or an LSI including the receiver module are connected to various buses, for example, a PCI bus or a processor bus, which is configured to control the transmitter module or the LSI including the transmitter module, and the receiver module or the LSI including the receiver module. In such cases, the information on the valid data area obtained in the transmitter module can be conveyed via the bus to the receiver module.

The receiver module can readily extract valid data by receiving such information on the valid data area. However, the information on the valid data area, and the video data are transmitted via different transmission paths. Therefore, even if there has been the change of the valid data area which is associated with the change of the video format, a setting for extraction of the valid data area may not be able to be changed simultaneously with the change of the format, and a normal video output may not be obtained immediately after the change of the video format.

Japanese Patent Application Laid-Open Publication No. 2007-13464 discloses an apparatus in which, if a display is switched from a first video signal to a second video signal, the first video signal is outputted to a displaying module also after the switching, until a signal process for the display of the second video signal is terminated. Thereby, the invention of Japanese Patent Application Laid-Open Publication No. 2007-13464 enables smooth video switching.

However, immediately after the change of the video format, the receiver module cannot obtain the video data immediately after the change of the video format. In other words, there is a problem that the receiver module cannot seamlessly obtain the video data immediately after the change of the video format of the video data from the transmitter module.

BRIEF SUMMARY OF THE INVENTION

A video data transmitting and receiving apparatus according to an aspect of the present invention includes a data transmitting module configured to be able to arrange video data in a first video format, into a valid data area of a first transmission format, and transmit the video data, and also to arrange video data in a second video format different from the first video format, into an effective valid data area within the valid data area of the first transmission format, and transmit the video data; and a data receiving module configured to receive the data transmitted in the first transmission format from the data transmitting module, and obtain the video data in the second video format within the valid data area.

Moreover, a video data transmitting and receiving method according to an aspect of the present invention includes arranging video data in a first video format, into a valid data area of a first transmission format, and transmitting the video data, and also arranging video data in a second video format different from the first video format, into an effective valid data area within the valid data area of the first transmission format, and transmitting the video data, by a data transmitting module; and receiving the data transmitted in the first transmission format from the data transmitting module, and obtaining the video data in the second video format within the valid data area, by a data receiving module.

DETAILED DESCRIPTION OF THE INVENTION

Hereinafter, embodiments of the present invention will be described in detail with reference to the drawings.

First Embodiment

Figure 1:
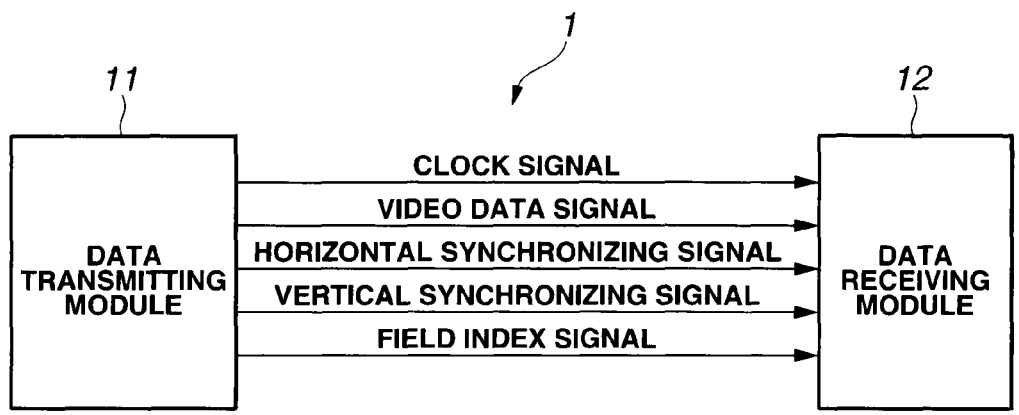
FIG. 1 is a block diagram showing a video data transmitting and receiving apparatus according to a first embodiment of the present invention.
Figure 2:
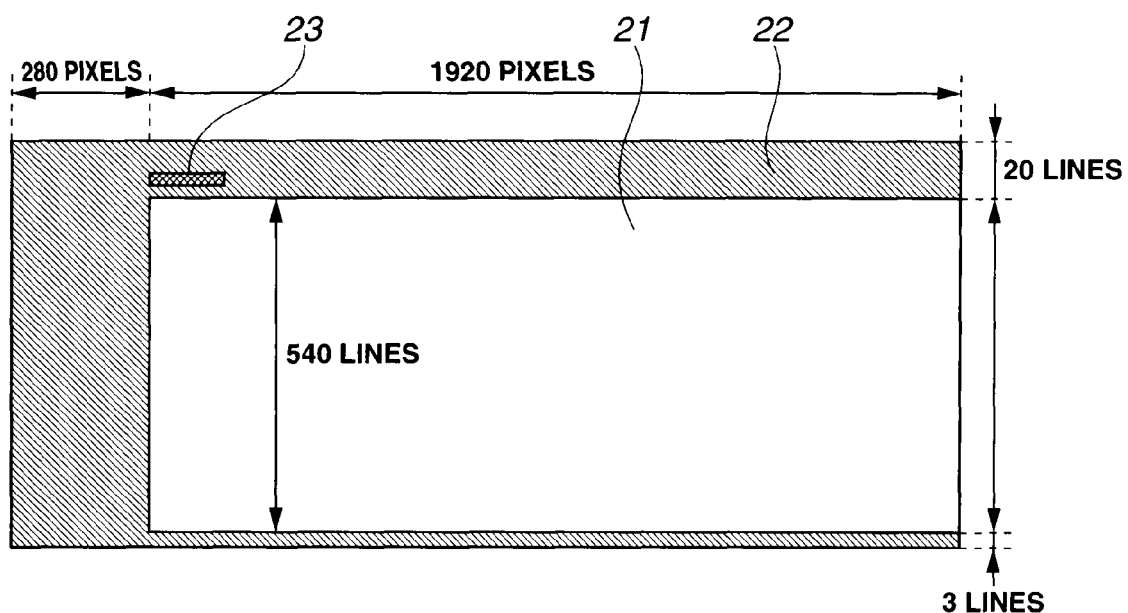
FIG. 2 is an explanatory diagram of a video data format represented corresponding to a display.

FIG. 1 is a block diagram showing a video data transmitting and receiving apparatus according to a first embodiment of the present invention. Moreover, FIG. 2 is an explanatory diagram of a video data format represented corresponding to a display.

In the present embodiment, Japanese Patent Application No. 2007-340788 which has been previously filed by the present applicant is used. In a proposition of Japanese Patent Application No. 2007-340788, a blanking period of video data to be transmitted is superimposed with valid data area information. FIG. 2 describes the proposition. An example of FIG. 2 shows video data in 1920×1080i. One frame of the video data in 1920×1080i is composed of two fields of 1920×540, and FIG. 2 shows one field.

It should be noted that, in the present embodiment, although the example of using Japanese Patent Application No. 2007-340788 will be described, a method other than the proposition of Japanese Patent Application No. 2007-340788 may be used if the valid data area information can be transmitted.

A video format is defined by the numbers of horizontal and vertical pixels, the numbers of horizontal and vertical valid pixels, and a scanning system. For the video data, an invalid period in the display is required for a retrace line process or the like in a displaying module. In FIG. 2, a shaded portion indicates an area of the invalid period (blanking area) 22. A non-colored portion of FIG. 2 indicates a valid data area 21 which is a period for pixels which are valid for the display. A receiver module may retrieve only data corresponding to the valid data area 21 from the video data to be transmitted.

Consequently, valid data area information 23 which is information regarding the valid data area 21 is included in the blanking area which is transmitted prior to the valid data area 21, and is transmitted. The receiver module can obtain the information regarding the valid data area 21 before receiving the data in the valid data area 21. Thereby, even if the video format of the video data to be transmitted is changed and the valid data area 21 is changed, a setting at the receiver side can be renewed in accordance with the video format in a relatively short time, which enables a seamless display.

It should be noted that, as the valid data area information 23, for example, coordinate position information on both a coordinate position of an upper left start point (beginning) and a coordinate position of a lower right end point in the valid data area 21, which can decide the valid data area 21 in FIG. 2, can be used.

The valid data area information 23 can be represented, as an example, as a combination of such two coordinate positions. Also, if there are multiple valid data areas 21, such combinations may be prepared for the number of the valid data areas 21, and a position or a specification of the information to be superimposed may be matched (consistent) between a transmitter side and the receiver side.

Moreover, the example of FIG. 2 shows a position of the valid data area information 23 in an example of a case of a first field with 2200 pixels in a horizontal direction and 563 pixels in a vertical direction. However, also in a case of other video formats, if the position of the valid data area information 23 is set at a common predetermined position, that is, at a fixed position that is a predetermined position which is not changed in any video format, the valid data area information 23 can be readily detected.

Furthermore, in the present embodiment, even if the video format of the video data to be transmitted is changed, change of a transmission format is suppressed, and thereby the receiver module can further readily obtain the video data. If the transmission format has been changed, a transmitting module and the receiving module need to change settings, and the receiver module also needs to detect a synchronizing signal again in order to obtain the transmitted video data. Consequently, in the present embodiment, even if the video format of the video data to be transmitted is changed, ingenuity is demonstrated in preventing the change of the transmission format.

FIGS. 3 to 10 describe the prevention of the change of the transmission format. It should be noted that, in FIGS. 3 to 10, numbers in parentheses denote line numbers, and shaded portions indicate the blanking areas.

If a frame or field frequency is identical, as long as a valid data area size (the numbers of horizontal and vertical valid pixels) of the changed video format is completely included in the valid data area size before the change, video data in different video formats can be transmitted in the same transmission format by changing only the valid data area without changing the transmission format.

Figure 3:
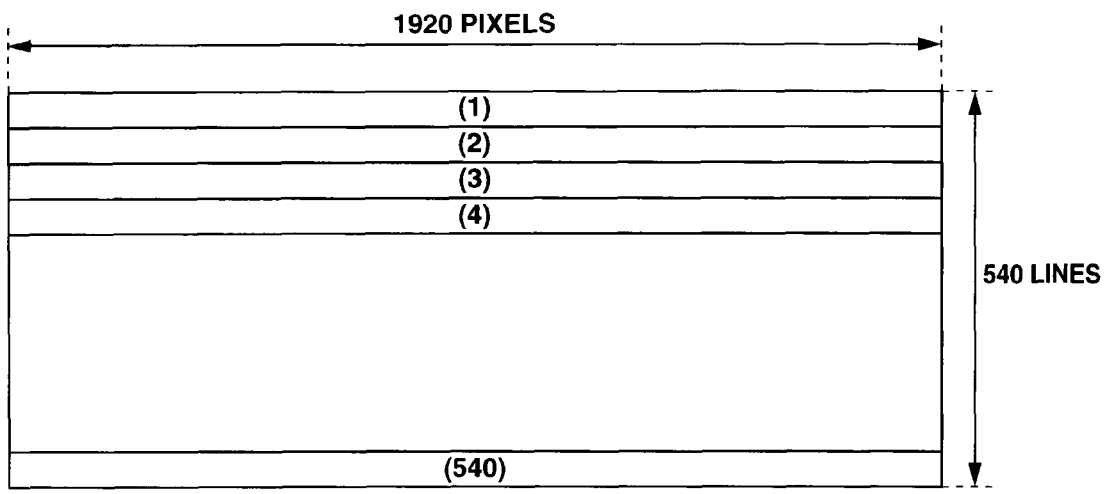
FIG. 3 is an explanatory diagram of a video format of 1920×1080i represented corresponding to the display.
Figure 4:
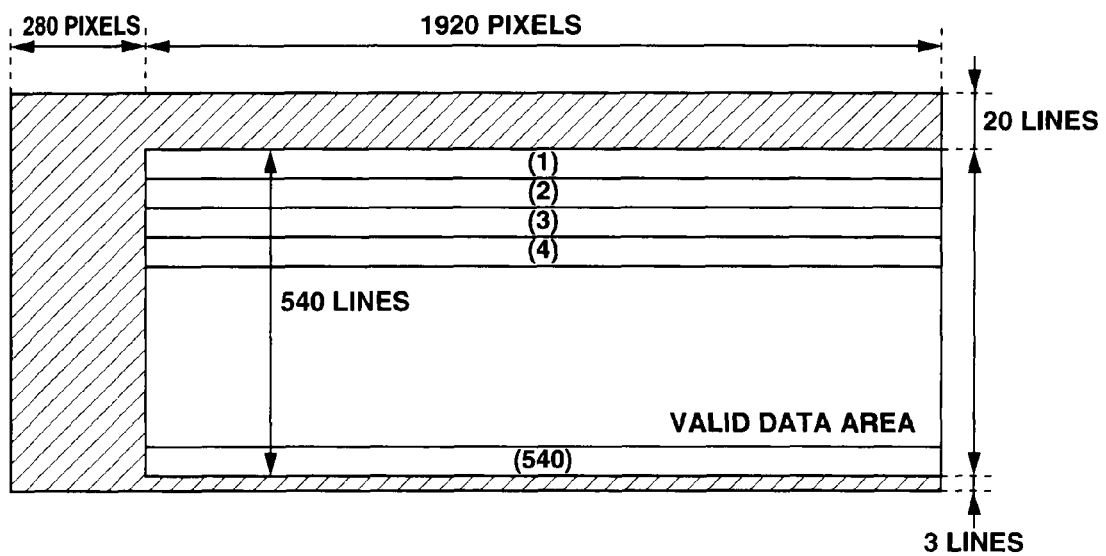
FIG. 4 is an explanatory diagram of a transmission format of 1920×1080i represented corresponding to the display.

FIGS. 3 and 4 are explanatory diagrams of a video format and a transmission format of 1920×1080i represented corresponding to the display, respectively. In the video format of 1920×1080i, the numbers of horizontal and vertical valid pixels are 1920×540, as shown in FIG. 3. The numbers of horizontal and vertical pixels including the blanking area are 2200×563 (or 562), as shown in FIG. 4. When a transmitter module transmits the video data to the receiver module, the video data including the blanking area is transmitted. Therefore, FIG. 4 shows the transmission format of 1920×1080i.

Figure 5:
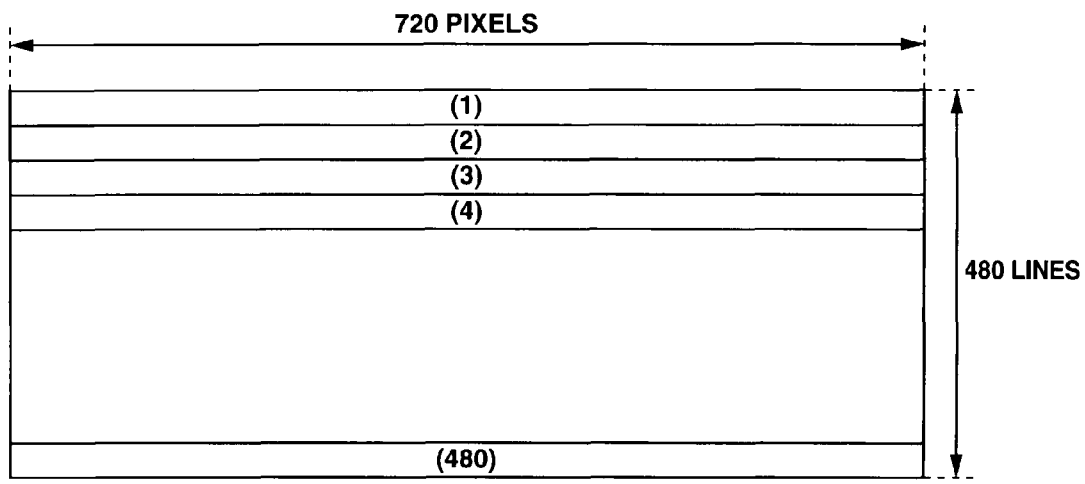
FIG. 5 is an explanatory diagram of a video format of 720×480p represented corresponding to the display.
Figure 6:
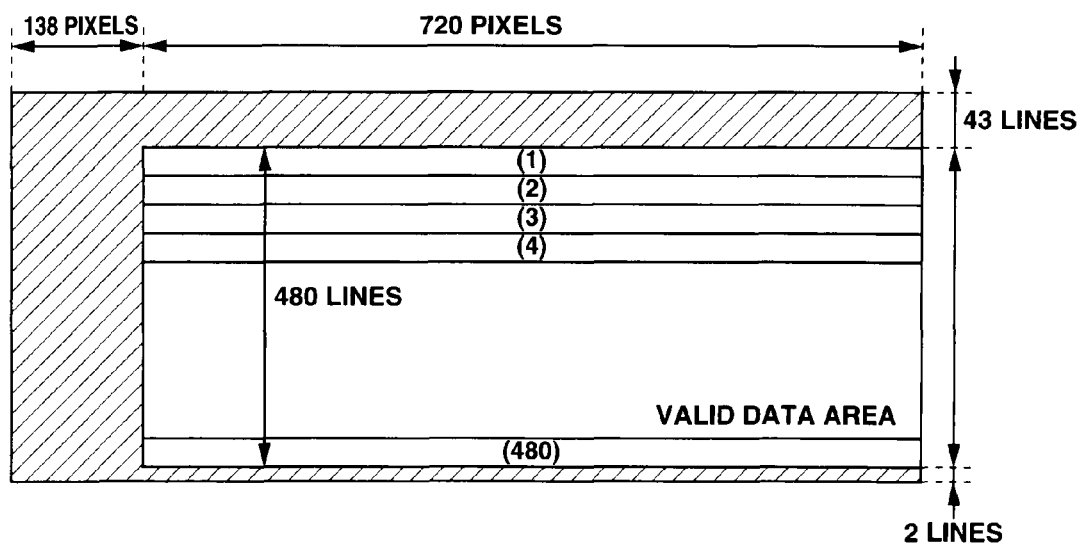
FIG. 6 is an explanatory diagram of a transmission format of 720×480p represented corresponding to the display.

Moreover, FIGS. 5 and 6 are explanatory diagrams of a video format and a transmission format of 720×480p represented corresponding to the display, respectively. The numbers of horizontal and vertical valid pixels of 720×480p are 720×480, as shown in FIG. 5. The transmission format of 720×480p has a size of the numbers of horizontal and vertical pixels including the blanking area, that is, 858×525, as shown in FIG. 6.

It is assumed that the video format is switched from the video data in 1920×1080i to video data in 720×480p. In such a case, the numbers of horizontal and vertical valid pixels of 1920×1080i are 1920×540, and the numbers of horizontal and vertical valid pixels of 720×480p are 720×480. Therefore, the valid data area of 720×480p is completely included in the valid data area of 1920×1080i.

Consequently, in the present embodiment, the data in the valid data area of 720×480p is transmitted by using the valid data area of the transmission format of 1920×1080i. In other words, in such a case, the video data in 1920×1080i can be switched to the video data in 720×480p without changing the transmission format of 1920×1080i.

Figure 7:
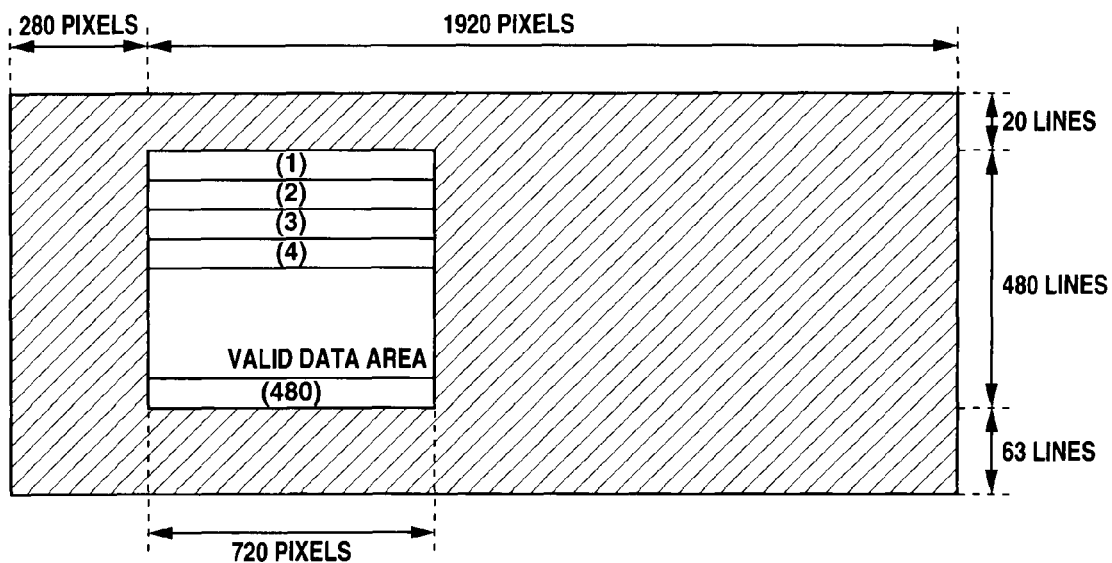
FIG. 7 is an explanatory diagram of transmission data represented corresponding to a screen display.

FIG. 7 is an explanatory diagram of transmission data represented corresponding to a screen display in such a case. In the transmission format of 1920×1080i, the data in the valid data area of 720×480p is arranged within the valid data area of 1920×1080i.

Figure 8:
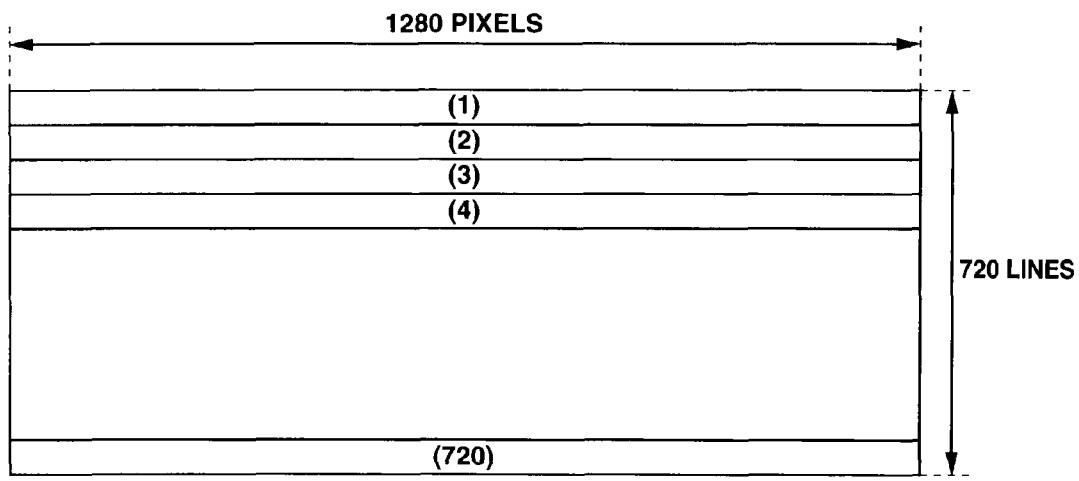
FIG. 8 is an explanatory diagram of a video format of 1280×720p represented corresponding to the display.
Figure 9:
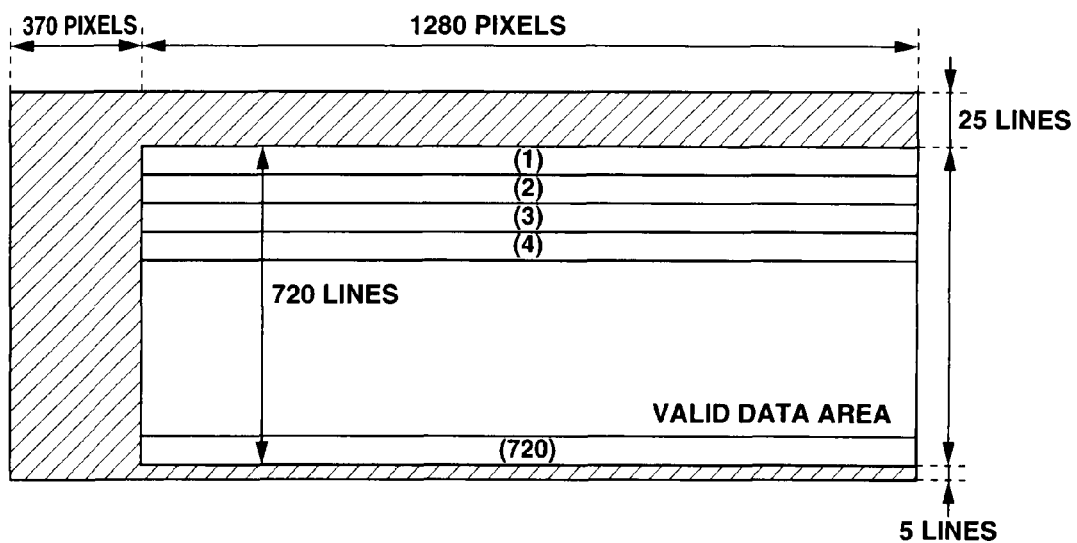
FIG. 9 is an explanatory diagram of a transmission format of 1280×720p represented corresponding to the display.

However, the valid data area size of the video format before being changed may not include the valid data area size after the change. FIGS. 8 and 9 are explanatory diagrams of a video format and a transmission format of 1280×720p represented corresponding to the display, respectively. The numbers of horizontal and vertical valid pixels of 1280×720p are 1280×720, as shown in FIG. 8. The transmission format of 1280×720p has a size of the numbers of horizontal and vertical pixels including the blanking area, that is, 1650×750, as shown in FIG. 9.

Now, it is assumed that the video format is switched from the video data in 1920×1080i to the video data in 1280×720p. In such a case, the numbers of horizontal and vertical valid pixels of 1920×1080i are 1920×540, and the numbers of horizontal and vertical valid pixels of 1280×720p are 1280×720. Therefore, the valid data area of 1280×720p has the larger number of vertical valid pixels and is not included within the valid data area of 1920×1080i. However, 1920×1080i has the larger total number of valid pixels than 1280×720p.

Consequently, in the present embodiment, data of 1.5 lines within the valid data area of 1280×720p is arranged into an area of one line within the valid data area of 1920×1080i.

Figure 10:
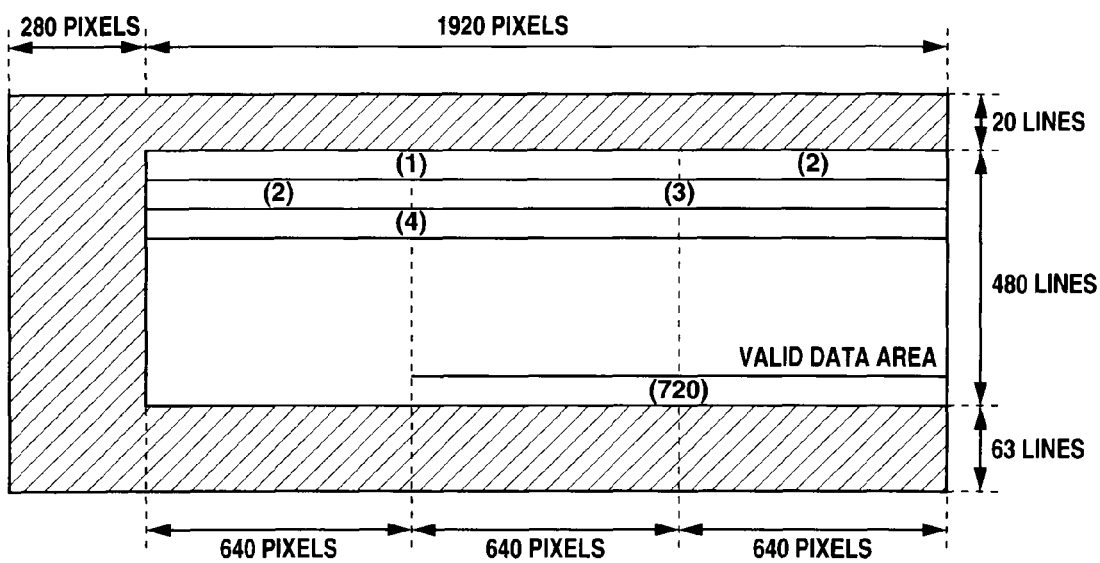
FIG. 10 is an explanatory diagram of the transmission data represented corresponding to the screen display.

FIG. 10 is an explanatory diagram of the transmission data represented corresponding to the screen display in such a case. In the transmission format of 1920×1080i, the data in the valid data area of 1280×720p is arranged into an area of 480 lines within the valid data area of 1920×1080i.

Next, an apparatus configured to realize transmission and reception of such video data will be described.

In FIG. 1, a video data transmitting and receiving apparatus 1 is composed of a data transmitting module 11 and a data receiving module 12. The data transmitting module 11 outputs a video data signal, a clock signal, a horizontal synchronizing signal, a vertical synchronizing signal and a field index signal to the data receiving module. It should be noted that, if the video data is superimposed with the synchronizing signal, all or some of the horizontal synchronizing signal, the vertical synchronizing signal and the field index signal may not exist.

The data transmitting module 11 reads the video data from a not-shown storage device such as a memory (hereinafter referred to as "transmitter memory"), and outputs the video data at an appropriate timing in accordance with the transmission format. It should be noted that the data transmitting module 11 transmits one pixel of the video data per clock from an upper left pixel within the frame or the field, in raster scan order. Moreover, the horizontal and vertical synchronizing signals are asserted in synchronization with the raster scan.

The data receiving module 12 receives the video data from the data transmitting module 11, extracts the valid data area, and supplies the valid data area to a video processing module or a storage device such as a memory (hereinafter referred to as "receiver memory"), which is at a post stage and not-shown.

Figure 11:
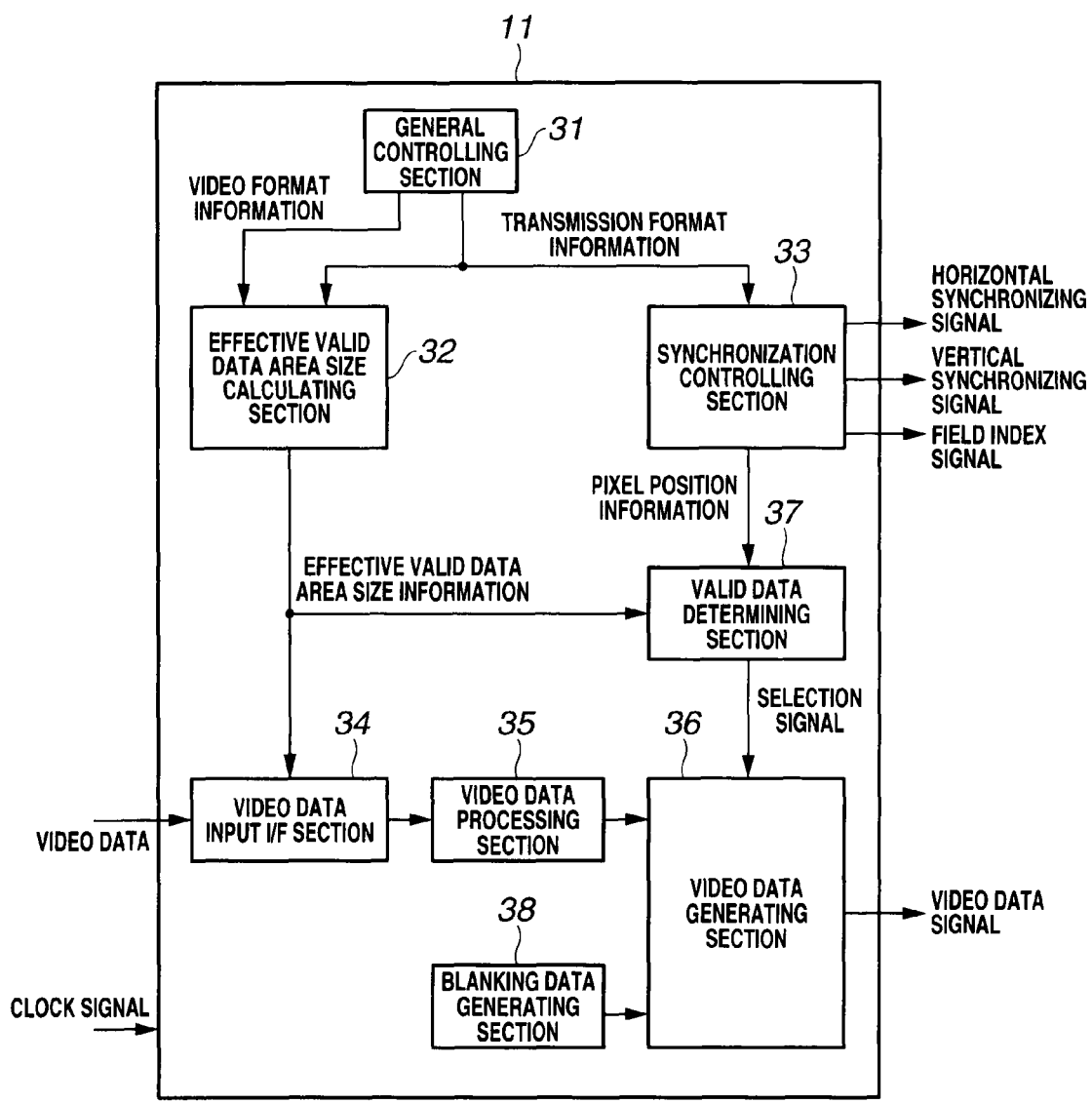
FIG. 11 is a block diagram showing a specific configuration of a data transmitting module in FIG. 1.

FIG. 11 is a block diagram showing a specific configuration of the data transmitting module in FIG. 1. A general controlling section 31 is a block configured to control the entire data transmitting module 11. The general controlling section 31 outputs video format information which is information regarding the video format of inputted video data, to an effective valid data area size calculating section 32. Moreover, the general controlling section 31 also outputs transmission format information which has been used for the transmission of the video data until then, to the effective valid data area size calculating section 32 and a synchronization controlling section 33.

The synchronization controlling section 33 generates pixel position information which is information on a pixel position of each pixel of the outputted video data signal based on the inputted transmission format information, and outputs the pixel position information to a valid data determining section 37. As will be described later, the valid data determining section 37 outputs a selection signal indicating whether each pixel position is set as the data within the valid data area or the data in the blanking area. Moreover, the synchronization controlling section 33 generates the vertical synchronizing signal, the horizontal synchronizing signal and the field index signal based on the transmission format information, and outputs the signals as a part of the transmission format information, depending on a mode of connection with the data receiving module 12.

The effective valid data area size calculating section 32 generates effective valid data area size information, based on the video format information and the transmission format information. The effective valid data area size information is information indicating an effective size of the valid data area in a case where the data in the valid data area of the input video data is arranged into the valid data area of the transmission format. For example, in the above described example of FIG. 10, the effective valid data area size is 1920×480.

Figure 12:
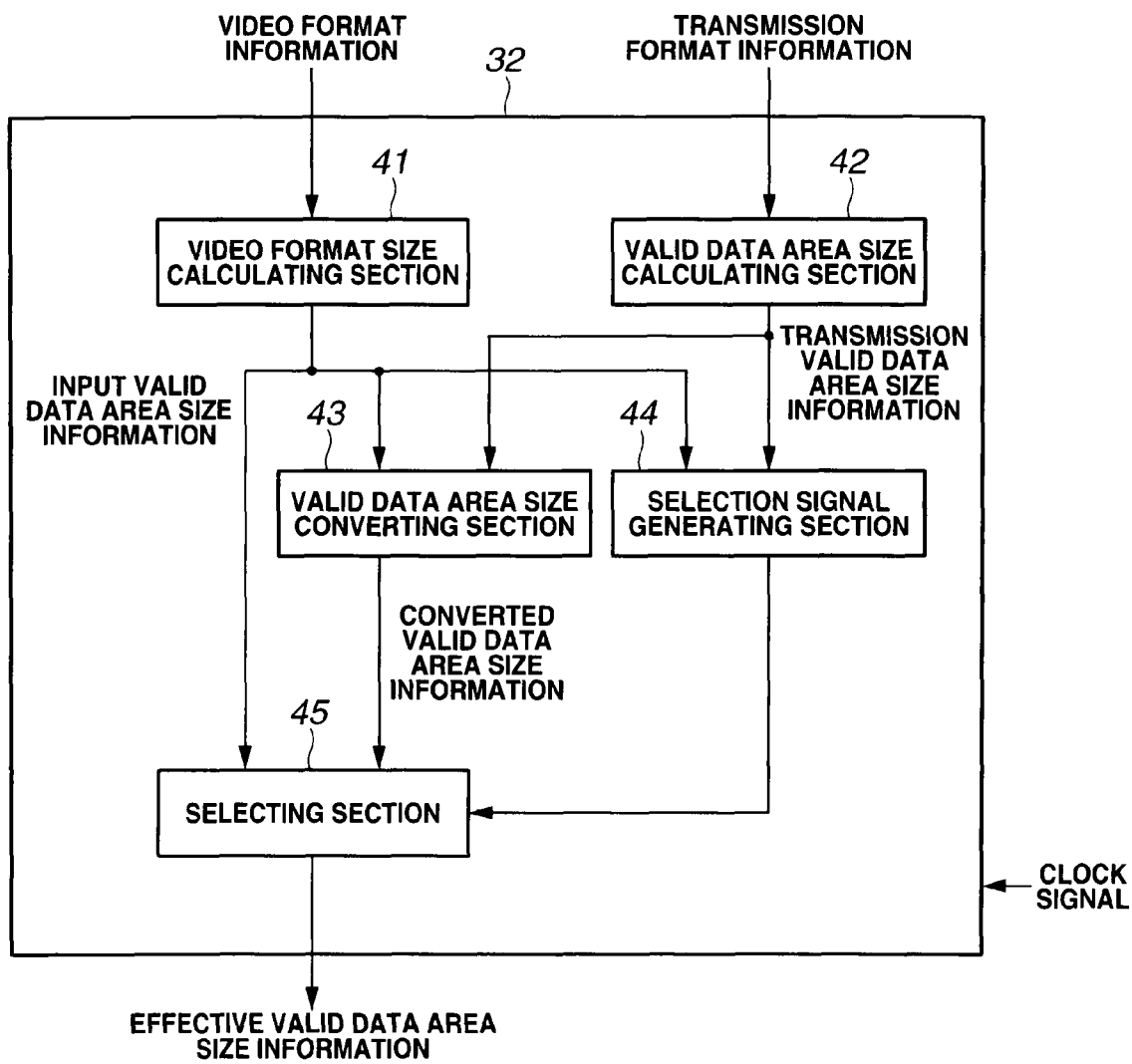
FIG. 12 is a block diagram showing a specific configuration of an effective valid data area size calculating section 32 in FIG. 11.

FIG. 12 is a block diagram showing a specific configuration of the effective valid data area size calculating section 32 in FIG. 11.

The video format information from the general controlling section 31 is supplied to a video format size calculating section 41. Moreover, the transmission format information from the general controlling section 31 is supplied to a valid data area size calculating section 42. The video format size calculating section 41 calculates the valid data area size of the input video data (hereinafter referred to as "input valid data area size"), and outputs the input valid data area size to a valid data area size converting section 43, a selection signal generating section 44 and a selecting section 45. For example, in a case of the video data in 1280×720p in FIG. 8, the video format size calculating section 41 outputs 1280×720 as the input valid data area size.

The valid data area size calculating section 42 calculates the valid data area size of the transmission format (hereinafter referred to as "transmission valid data area size"), and outputs the transmission valid data area size to the valid data area size converting section 43 and the selection signal generating section 44. For example, in a case of the transmission format of 1920×1080i in FIG. 4, the valid data area size calculating section 42 outputs 1920×540 as the transmission valid data area size.

The valid data area size converting section 43 calculates a converted valid data area size which is the effective size of the valid data area in a case where the video data has been arranged into the valid data area of the transmission format, based on the input valid data area size of the video format and the transmission valid data area size of the transmission format. For example, in a case where the video data in 1280×720p in FIG. 8 is arranged into the valid data area of 1920×540 in FIG. 4, 1920×480 is obtained as an example of the converted valid data area size.

The input valid data area size based on the video format of the input video data, and the converted valid data area size based on the video format and the transmission format are inputted to the selecting section 45. The selection signal generating section 44 compares the input valid data area size with the transmission valid data area size in terms of the number of vertical pixels. If the input valid data area size is smaller than the transmission valid data area size, the selection signal generating section 44 causes the selecting section 45 to select the input valid data area size. If the input valid data area size is larger than the transmission valid data area size, the selection signal generating section 44 causes the selecting section 45 to select the converted valid data area size. Under a control of the selection signal generating section 44, the selecting section 45 outputs information on the selected size, as the effective valid data area size information.

For example, if the transmission format of 1920×1080i is used to transmit the video data in 720×480p or the video data in 1280×720p, selection shown in the following Table 1 is performed.

TABLE 1

| Input video format | Transmission valid data area | | Input valid data area | Converted valid data area | Selection result |
|---|---|---|---|---|---|
| 720 × 480p | 1920 × 540 | > | 720 × 480 | — | 720 × 480 |
| 1280 × 720p | 1920 × 540 | < | 1280 × 720 | 1920 × 480 | 1920 × 480 |

In FIG. 11, based on the effective valid data area size information from the effective valid data area size calculating section 32, a video data input interface (I/F) section 34 transmits, if necessary, a data transfer request to the storage device such as the transmitter memory or a pre-stage processing module, receives supply of the video data, and outputs the video data to a video data processing section 35.

The video data processing section 35 applies a filter process or the like to the inputted video data if necessary, and subsequently outputs the video data to a video data generating section 36. Moreover, a blanking data generating section 38 generates blanking data based on the transmission format information, and outputs the blanking data to the video data generating section 36. It should be noted that the blanking data generating section 38 causes the effective valid data area size information to be included in the blanking data, as the valid data area information shown in FIG. 2, and outputs the effective valid data area size information included in the blanking data.

The valid data determining section 37 determines an effective valid data area based on the pixel position information from the synchronization controlling section 33 and the effective valid data area size information from the effective valid data area size calculating section 32, and outputs a result of the determination as the selection signal to the video data generating section 36.

The video data generating section 36 uses the selection signal from the valid data determining section 37 to select the blanking data from the blanking data generating section 38 and the video data from the video data processing section 35 based on the transmission format, and outputs the blanking data and the video data as the video data signal.

As described above, the data transmitting module 11 can transmit the video data by using the transmission format having the transmission valid data area size different from the input valid data area size of the input video data. Thereby, even if the video format of the input video data is changed, the video data can be transmitted without changing the transmission format. Moreover, since the effective valid data area size information on the transmission format is superimposed on the blanking area and is transmitted, the data in the valid data area can be readily obtained at the receiver side based on the information.

Figure 13:
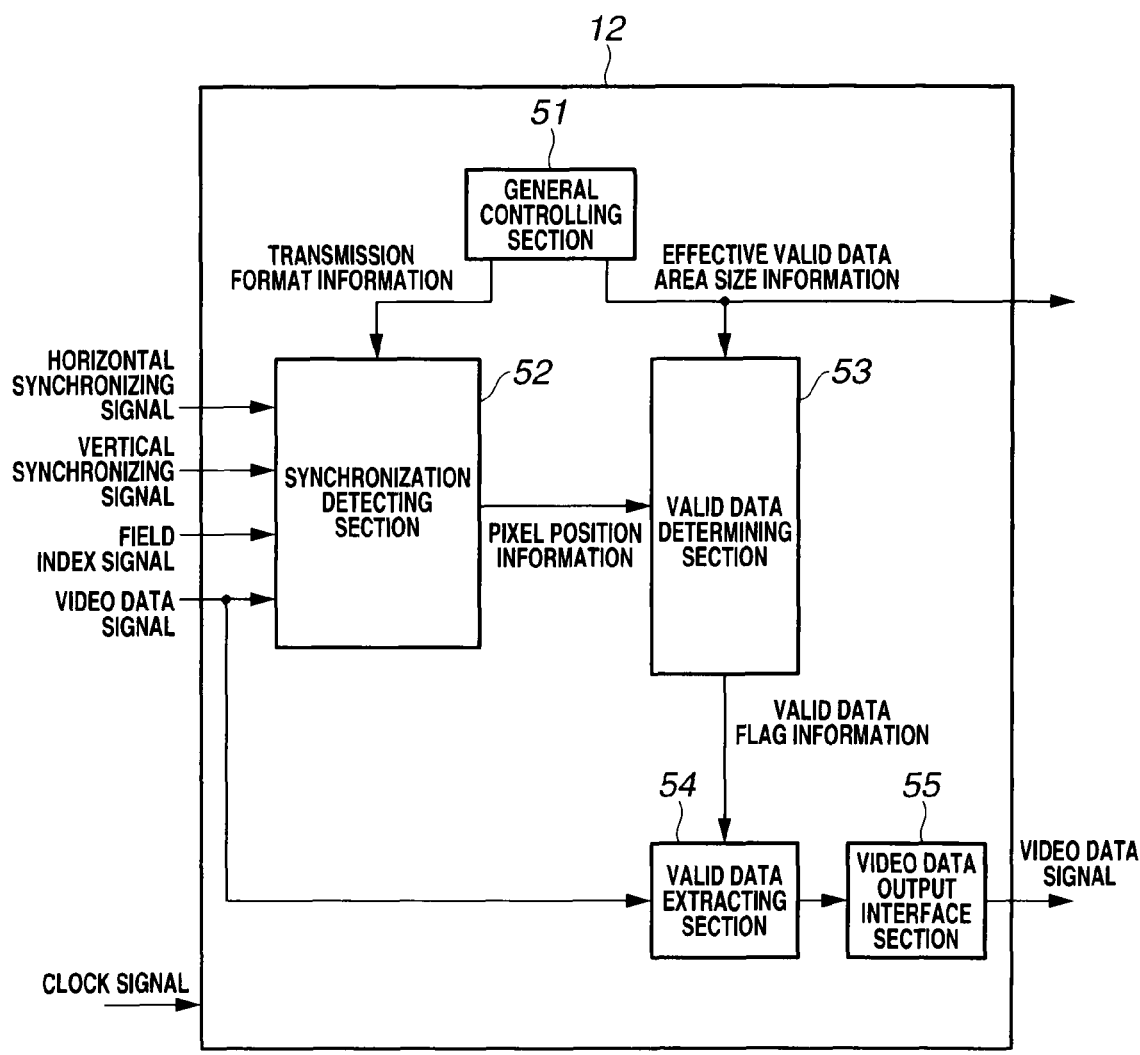
FIG. 13 is a block diagram showing a specific configuration of a data receiving module in FIG. 1.

FIG. 13 is a block diagram showing a specific configuration of the data receiving module in FIG. 1.

A general controlling section 51 is a block configured to control the entire data receiving module 12. The general controlling section 51 retains the transmission format information used for the output video data of the data transmitting module 11. Moreover, the general controlling section 51 obtains the effective valid data area size information multiplexed in the blanking area of the video data signal (not shown).

It should be noted that the effective valid data area size information needs to be transmitted from the data transmitting module 11 to the data receiving module 12, simultaneously with the video data, or in advance along with switching timing information. In the present embodiment, a method according to the proposition of Japanese Patent Application No. 2007-340788 has been employed. It is obvious that the effective valid data area size information may be transmitted by other methods.

The general controlling section 51 outputs the transmission format information to a synchronization detecting section 52, and outputs the effective valid data area size information to a valid data determining section 53. The inputted video data is supplied to the synchronization detecting section 52 and a valid data extracting section 54. If the horizontal synchronizing signal, the vertical synchronizing signal and the field index signal have been outputted from the data transmitting module 11, the signals are also supplied to the synchronization detecting section 52.

The synchronization detecting section 52 detects information on horizontal, vertical and field phases based on the synchronizing signal superimposed on the video data, or based on externally inputted various synchronizing signals, and obtains position information on currently inputted video data within the field or the frame.

The valid data determining section 53 determines validity of the video data within the frame based on the position information obtained by the synchronization detecting section 52 and the effective valid data area size information from the general controlling section 51, and outputs valid data flag information. The valid data extracting section 54 extracts valid data based on the valid data flag information from the valid data determining section 53, and outputs the valid data to a video data output interface section 55. The video data output interface section 55 outputs the video data extracted as the data in the valid data area to the video processing module or the storage device such as the receiver memory, both of which are not shown and at the post stage.

It should be noted that the general controlling section 51 can output the effective valid data area size information, the video format information and the like to the receiver memory configured to store the received video data, the video processing module and the like. For example, readout from the receiver memory can be controlled and the video data in the transmitted video format can be restored, by giving the effective valid data area size information to a readout circuit of the receiver memory.

Figure 14:
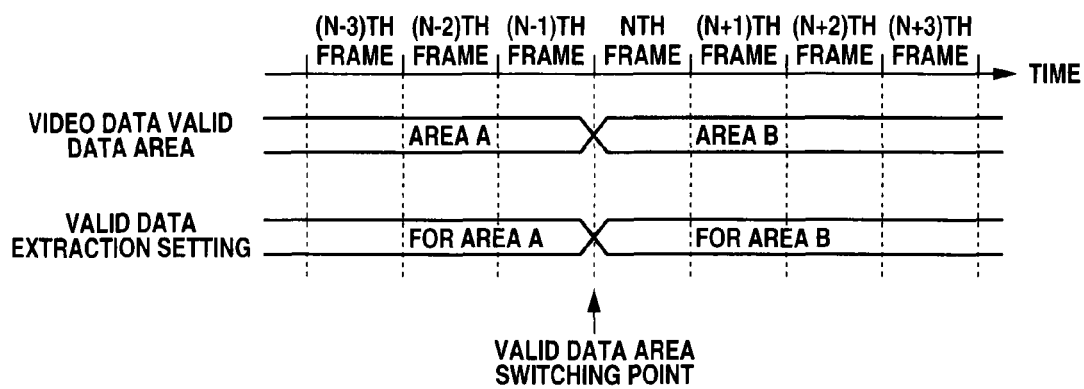
FIG. 14 is a timing chart for describing operations of the embodiment.
Figure 15:
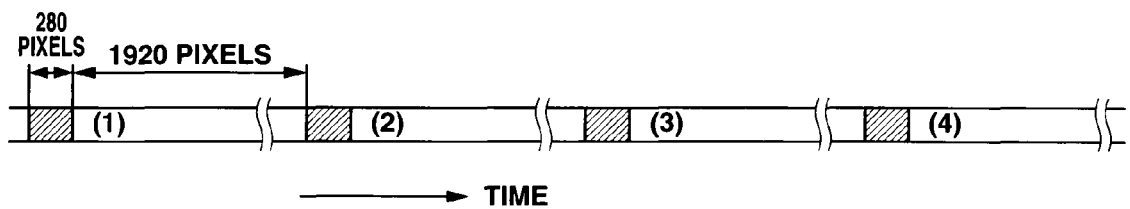
FIG. 15 is a timing chart of video data transfer.
Figure 16:
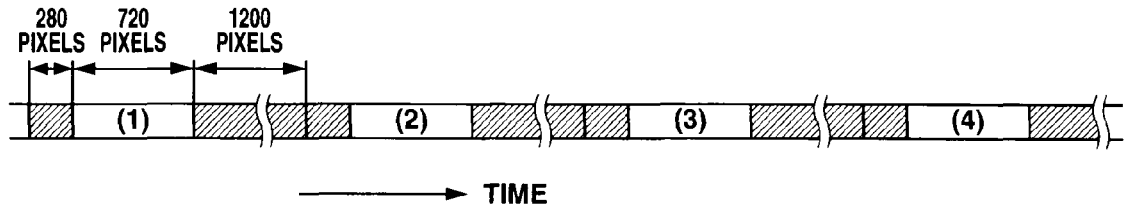
FIG. 16 is a timing chart of the video data transfer.
Figure 17:
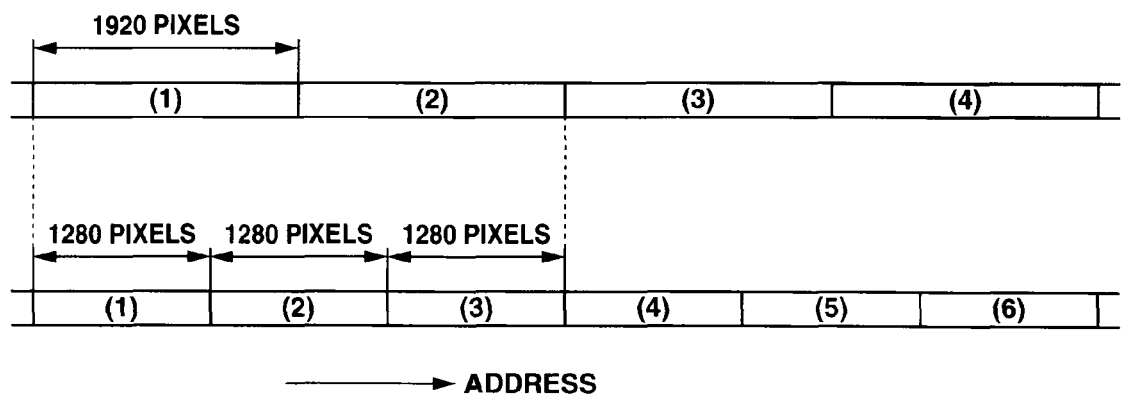
FIG. 17 is an explanatory diagram showing storage of video data in 1920×1080i and video data in 1280×720p into a memory.
Figure 18:
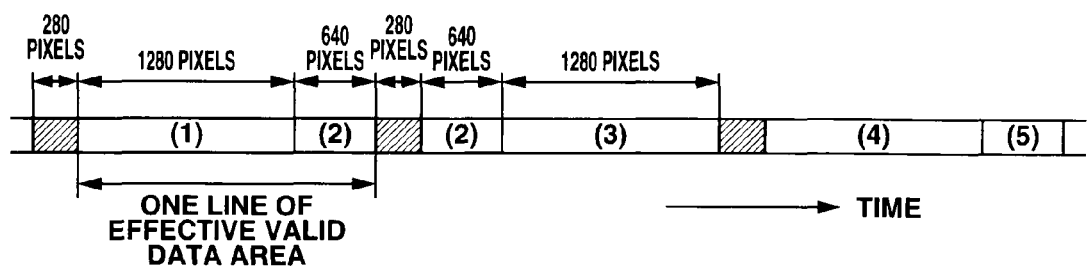
FIG. 18 is a timing chart of the video data transfer.

Next, operations of the embodiment configured as described above will be described with reference to FIGS. 14 to 18. FIG. 14 is a timing chart for describing the operations of the embodiment. FIGS. 15, 16 and 18 are timing charts for describing storage of the video data into the memory. Moreover, FIG. 14 is a timing chart showing a part of video data transfer until an (N−1)th frame. The upper view of FIG. 17 is an explanatory diagram showing storage of the video data in 1920×1080i. The lower view of FIG. 17 is one showing storage of the video data in 1280×720p into the transmitter memory. In FIGS. 14 to 18, numbers in parentheses denote the line numbers, and shaded portions indicate the blanking areas.

First, in a case where the video data format of the video data to be transmitted is switched, an example in which the valid data area size of the changed video format is completely included in the valid data area size before the change will be described. As an example, it is assumed that the transmission of the video data in the video format of 1920×1080i (FIG. 3) is switched to the transmission of the video data in the video format of 720×480p (FIG. 5).

In FIG. 14, the transmission of the video data in 1920×1080i is performed until the (N−1)th frame, and the transmission of the video data in 720×480p is performed from a next Nth frame. The valid data areas of the above video data are 1920×540 (area A) and 720×480 (area B), respectively.

For the video data transfer until the (N−1)th frame, as shown in FIG. 15, each line of the video format is completely identical to each line of the valid data area of the transmission format.

When the transmission of the video data in 1920×1080i is switched to the transmission of the video data in 720×480p, the general controlling section 31 outputs information on 1920×1080i as the video format information to the effective valid data area size calculating section 32. Moreover, the general controlling section 31 outputs the information on 1920×1080i shown in FIG. 4 as the transmission format information to the effective valid data area size calculating section 32 and the synchronization controlling section 33. The synchronization controlling section 33 outputs the horizontal synchronizing signal, the vertical synchronizing signal, the field index signal and the pixel position information based on the transmission format of 1920×1080i.

On the other hand, the effective valid data area size calculating section 32 outputs information indicating 720×480 as the effective valid data area size information. The video data input I/F section 34 captures the video data based on the effective valid data area size information, and outputs the video data to the video data processing section 35. The video data processing section 35 applies a predetermined signal process to the inputted video data, and subsequently outputs the video data to the video data generating section 36. The blanking data generating section 38 generates the data in the blanking area including the effective valid data area size information, and outputs the data in the blanking area including the effective valid data area size information to the video data generating section 36.

Moreover, the valid data determining section 37 outputs the selection signal indicating the valid data area having the size of 720×480 on the transmission format to the video data generating section 36, based on the pixel position information and the effective valid data area size information. The video data generating section 36 selects the output of the video data processing section 35 and the output of the blanking data generating section 38 based on the selection signal, generates and outputs the video data signal.

FIG. 16 is a timing chart of the video data transfer in such a case. The video data in 720×480p is transmitted in the effective valid data area size within the valid data area of the transmission format of 1920×1080i. As shown in FIG. 16, data of 720 pixels for one line of the video data in 720×480p is arranged into each line of 1920 pixels in the valid data area of the transmission format of 1920×1080i, and is transmitted. As described above, the data transmission shown in FIG. 7 is performed.

Next, in the case where the video data format of the video data to be transmitted is switched, an example in which the valid data area size of the changed video format is not completely included in the valid data area size before the change will be described. As an example, it is assumed that the transmission of the video data in the video format of 1920×1080i (FIG. 3) is switched to the transmission of the video data in the video format of 1280×720p (FIG. 8).

For example, in FIG. 14, it is assumed that the transmission of the video data in 1920×1080i is performed until the (N−1)th frame, and the transmission of the video data in 1280×720p is performed from the next Nth frame. The valid data areas of the above video data are 1920×540 (area A) and 1280×720 (area B), respectively.

As shown in FIG. 17, a data amount of two lines of the video data in 1920×1080i stored in the transmitter memory is identical to a data amount of three lines of the video data in 1280×720p.

When the transmission of the video data in 1920×1080i is switched to the transmission of the video data in 1280×720p, the general controlling section 31 outputs the information on 1920×1080i as the video format information to the effective valid data area size calculating section 32. Moreover, the general controlling section 31 outputs the information on 1280×720p shown in FIG. 8 as the transmission format information to the effective valid data area size calculating section 32 and the synchronization controlling section 33. The synchronization controlling section 33 outputs the horizontal synchronizing signal, the vertical synchronizing signal, the field index signal and the pixel position information based on the transmission format of 1920×1080i.

On the other hand, as shown in FIG. 12, the effective valid data area size calculating section 32 obtains input valid data area size information based on the video data and transmission valid data area size information based on the transmission format. The valid data area size converting section 43 calculates 1920×480 as the converted valid data area size, and outputs information indicating 1920×480 to the selecting section 45. In such a case, the selecting section 45 outputs the converted valid data area size information as the effective valid data area size information, based on the output of the selection signal generating section 44.

As described above, the effective valid data area size calculating section 32 outputs the information indicating the effective valid data area size of 1920×480 to the video data input I/F section 34 and the valid data determining section 37. The video data input I/F section 34 captures the video data based on the effective valid data area size information. In other words, in such a case, as shown at a lower portion of FIG. 17, one line has been stored as 1280 pixels in the transmitter memory, while 1920 pixels, instead of 1280 pixels, are handled as one unit, that is, one line, in the readout from the transmitter memory by the data input I/F section 34.

The video data captured based on the effective valid data area size information indicating 1920×480 is inputted to the video data generating section 36. Moreover, the blanking data generating section 38 generates the data in the blanking area including the effective valid data area size information, and outputs the data in the blanking area including the effective valid data area size information to the video data generating section 36.

The valid data determining section 37 outputs the selection signal indicating the valid data area having the size of 1920×480 on the transmission format to the video data generating section 36. The video data generating section 36 selects the output of the video data processing section 35 and the output of the blanking data generating section 38 based on the selection signal, generates and outputs the video data signal.

FIG. 18 is a timing chart of the video data transfer in such a case. The video data in 1280×720p is transmitted in the effective valid data area size of 1920×480 within the valid data area of the transmission format of 1920×1080i. In other words, as shown in FIG. 10, data of (1280+640) pixels for 1.5 lines of the video data in 1280×720p is arranged into each line of 1920 pixels in the valid data area of the transmission format of 1920×1080i, and is transmitted.

Next, operations of the data receiving module 12 will be described. Now, operations in a case where the video data in 1920×1080i has been transmitted until the (N−1)th frame of FIG. 14, and the data shown in FIG. 18, that is, the video data in 1280×720p has been transmitted in the transmission format of 1920×1080i from the Nth frame of FIG. 14, from the data transmitting module 11 will be described.

The general controlling section 51 retains the transmission format information used for the transmission of the video data until the (N-1)th frame. Moreover, the general controlling section 51 obtains the effective valid data area size information multiplexed in the blanking area, before receiving the video data in the valid data area of the Nth frame.

The general controlling section 51 outputs the transmission format information to the synchronization detecting section 52, and outputs the effective valid data area size information to the valid data determining section 53. The inputted video data is supplied to the synchronization detecting section 52 and the valid data extracting section 54. The synchronization detecting section 52 detects the information on the horizontal, vertical and field phases based on the synchronizing signal superimposed on the video data, or based on externally inputted various synchronizing signals, and obtains the position information on the currently inputted video data within the field or the frame.

The valid data determining section 53 determines the validity of the video data within the frame based on the position information obtained by the synchronization detecting section 52 and the effective valid data area size information from the general controlling section 51, and outputs the valid data flag information. The valid data extracting section 54 extracts the valid data based on the valid data flag information from the valid data determining section 53, and outputs the valid data to the video data output interface section 55.

In other words, in such a case, data in an area of 1920×480 given by the effective valid data area size information is extracted from the transmission format of 1920×1080i. The extracted video data is outputted via the video data output interface section 55 to the video processing module or the storage device such as the receiver memory, which is not shown and at the post stage. As described above, the data receiving module 12 can obtain the video data in 1280×720p.

In the data receiving module 12, a setting for the extraction of the data in the valid data area is only switching of the effective valid data area size information used for performing the valid data determination. Therefore, as shown in FIG. 14, immediately after the video format is changed at the transmitter side, it is possible to change the setting at the receiver side to seamlessly receive the video data.

It should be noted that the video data from the video data output interface section 55 can be stored as the video data in 1280×720p, similarly to the transmitter shown in FIG. 17, by storing the video data from the video data output interface section 55, for example, in consecutive addresses in the not-shown receiver memory. It should be noted that, in FIG. 17, the video data is stored in consecutive areas in the receiver memory. The consecutive areas provide a merit of easier data access to the receiver memory. However, the consecutive areas are merely an example in every respect, and are not necessarily required.

It should be noted that the general controlling section 51 can output the effective valid data area size information, the video format information and the like. The video data in the transmitted video format can be restored by using the effective valid data area size information for the readout from the receiver memory.

As described above, in the present embodiment, even if the video format of the video data to be transmitted is changed, the video data after the change is transmitted by using the transmission format before being changed, and also the effective valid data area size information used for arranging the video data is obtained and transmitted to the receiver side. Thereby, the change of the setting in accordance with the change of the format can be performed at the receiver side in a short time, and the receiver side can seamlessly receive the video data in the different video formats.

Second Embodiment

Figure 19:
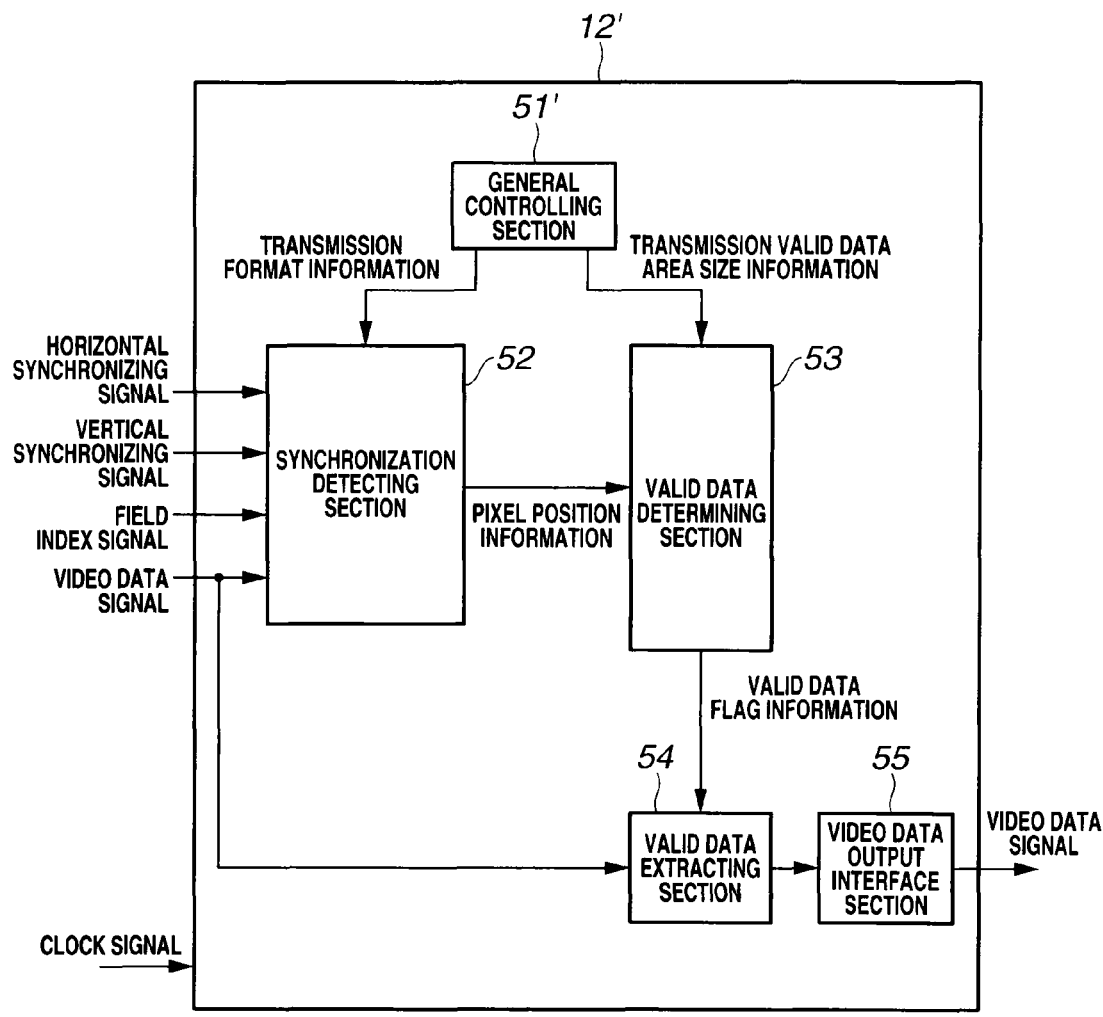
FIG. 19 is a block diagram showing a second embodiment of the present invention.

FIG. 19 is a block diagram showing a second embodiment of the present invention. In FIG. 19, constituent elements same as FIG. 13 are assigned with the same reference numerals, and descriptions thereof are omitted. The present embodiment is different from the first embodiment in that a data receiving module 12' employing a general controlling section 51' instead of the general controlling section 51 is used.

The general controlling section 51' is different from the general controlling section 51 only in that the general controlling section 51' outputs the transmission valid data area size information, instead of the effective valid data area size information, to the valid data determining section 53. The valid data determining section 53 generates the valid data flag information based on the pixel position information and the transmission valid data area size information.

In the first embodiment, the effective valid data area size information transmitted from the data transmitting module 11 (see FIG. 1) is used to determine the valid data to be extracted. However, the effective valid data area size information is not necessarily required for simply extracting only the data in the valid data area. It should be noted that since the transmission valid data area size information can be obtained from the transmission format information, the data transmitting module 11 is not required to transmit the information regarding the valid data area to the data receiving module 12'.

Figure 20:
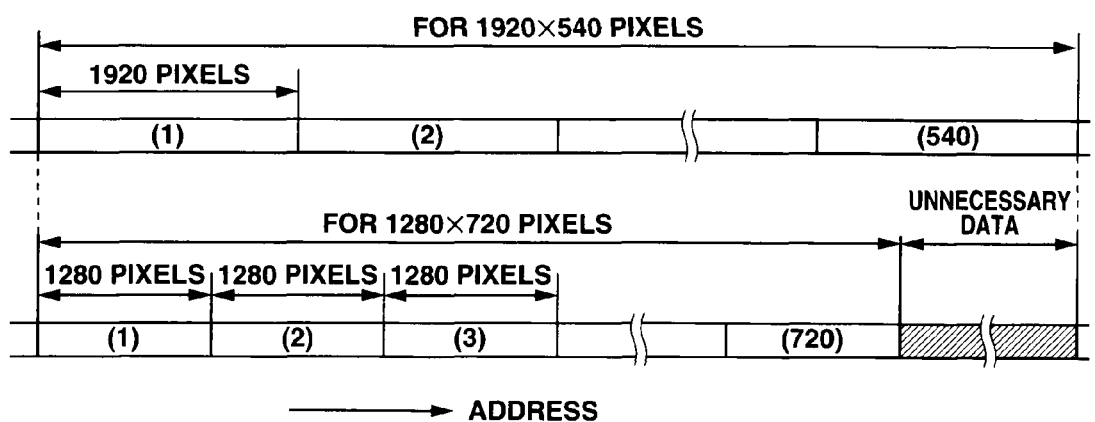
FIG. 20 is an explanatory diagram showing the storage of the video data in 1920×1080i and the video data in 1280×720p into the memory.

Next, operations of the embodiment configured as described above will be described with reference to FIG. 20. FIG. 20 is an explanatory diagram showing the storage of the upper video data in 1920×1080i and the lower video data in 1280×720p into the memory.

Now, operations in a case where the video data in 1920×1080i has been transmitted, and subsequently, the data shown in FIG. 18, that is, the video data in 1280×720p has been transmitted in the transmission format of 1920×1080i, from the data transmitting module 11 will be described.

In the data shown in FIG. 18, as shown in FIG. 10, the data in the valid data area of 1280×720p is arranged into the effective valid data area of 1920×480. In the present embodiment, the valid data determining section 53 uses the transmission valid data area size information to determine the valid data. In other words, the video data in 1280×720p has been arranged as shown in FIG. 10, while the format is handled as the normal transmission format of 1920×1080i as shown in FIG. 4 in the extraction of the data in the valid data area.

Therefore, if the video data from the video data output interface section 55 is stored in the receiver memory, data storage is performed, shown as an example at a lower portion of the FIG. 20. It should be noted that an upper portion of FIG. 20 shows a storage example in a case where the video data in 1920×1080i is stored in the memory.

As shown in FIG. 20, in the storage into the receiver memory, the video data is written as being in the video format of 1920×1080i, into an area of 1920×540 pixels. All the data in the valid data area of the video data in 1280×720p is included in the area of 1920×540 pixels. As described above, the data receiving module 12' can receive the video data in 1280×720p.

It should be noted that, in addition to all the data in the valid data area of the video data in 1280×720p, unnecessary data is included in the video data stored in the receiver memory according to the present embodiment, as shown at the lower portion of FIG. 20. Consequently, before the video data is read from the receiver memory by a post-stage module, actual valid data area size information is transmitted from the data transmitting module to the data receiving module 12'. In an example of FIG. 20, an actual valid data area size is 1280×720. Since the actual valid data area size information is used, it is possible to read out a 1920×480 pixel area in which the valid data in the area of 1920×540 pixels has been stored, as 1280×720 pixels, to eliminate the unnecessary data stored in the receiver memory, and to reproduce the video data as being in the video format of 1280×720p.

As described above, also in the present embodiment, advantages similar to the first embodiment can be obtained.

(Variations)

FIGS. 21 to 25 are diagrams showing a first variation. The effective valid data area size information from the effective valid data area size calculating section 32 of FIG. 11 includes not only the numbers of horizontal and vertical pixels in the effective valid data area, but also information indicating which area within the valid data area in the transmission format the effective valid data area is arranged into.

Figure 21:
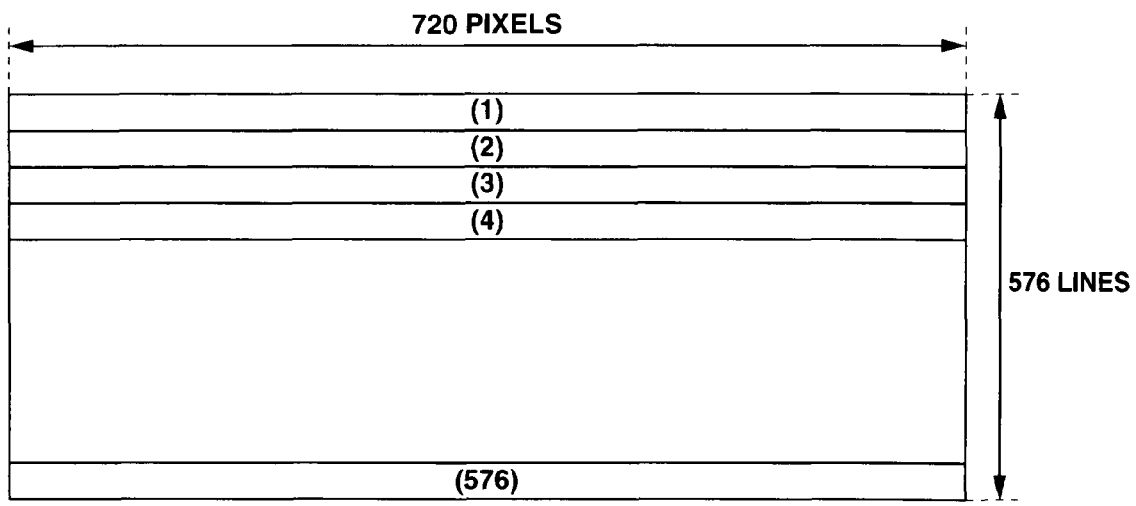
FIG. 21 is an explanatory diagram of a video format of 720×576p represented corresponding to the display.
Figure 22:
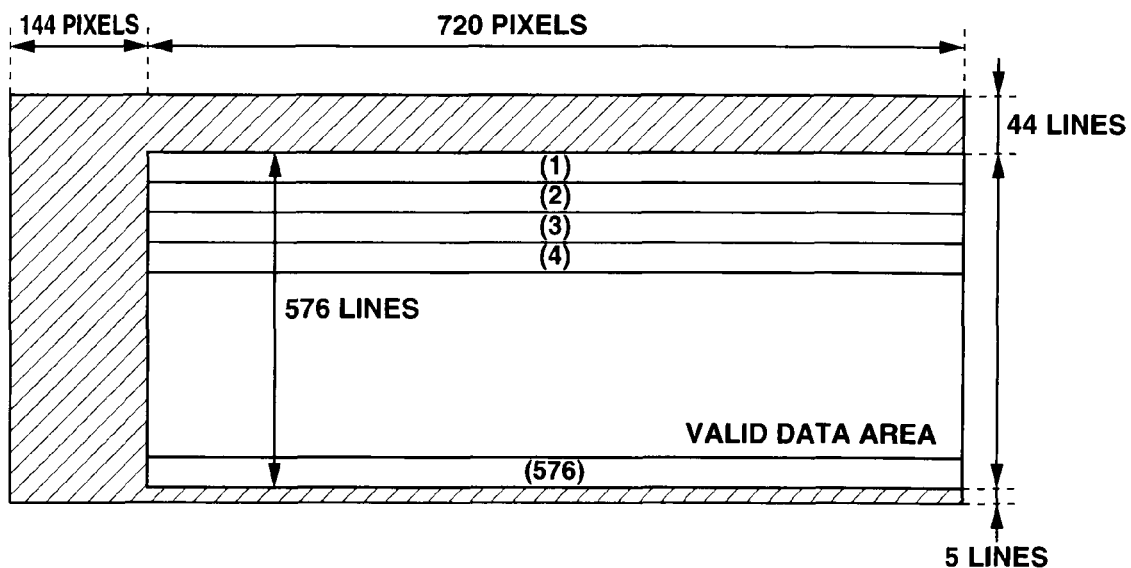
FIG. 22 is an explanatory diagram of a transmission format of 720×576p represented corresponding to the display.

The first variation is an example in which the data in a video format of 720×576p is transmitted in the transmission format of 1920×1080i. FIGS. 21 and 22 are explanatory diagrams of the video format and a transmission format of 720×576p represented corresponding to the display, respectively. In the 720×576p video format, the numbers of horizontal and vertical valid pixels are 720×576 as shown in FIG. 21, and the numbers of horizontal and vertical pixels including the blanking area are 864×625 as shown in FIG. 22.

Figure 23:
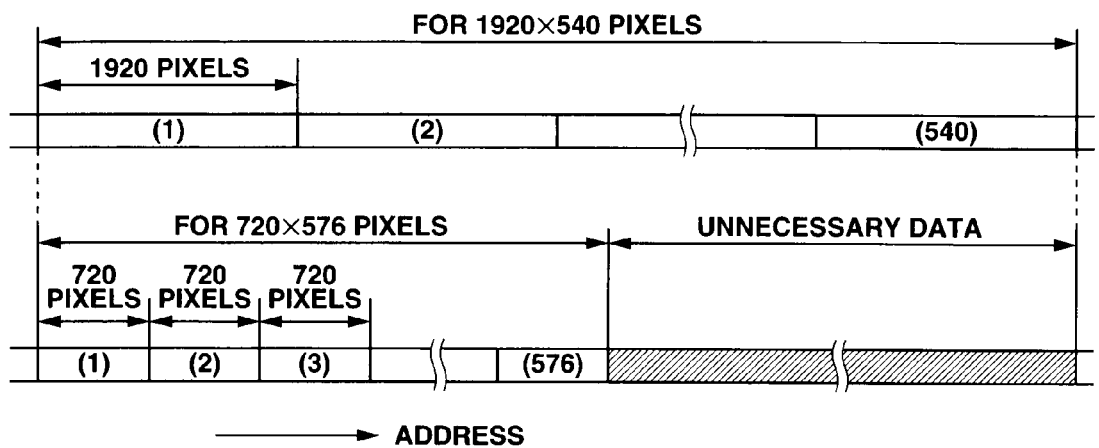
FIG. 23 is an explanatory diagram showing storage of the video data in 1920×1080i and video data in 720×576p into the memory.
Figure 24:
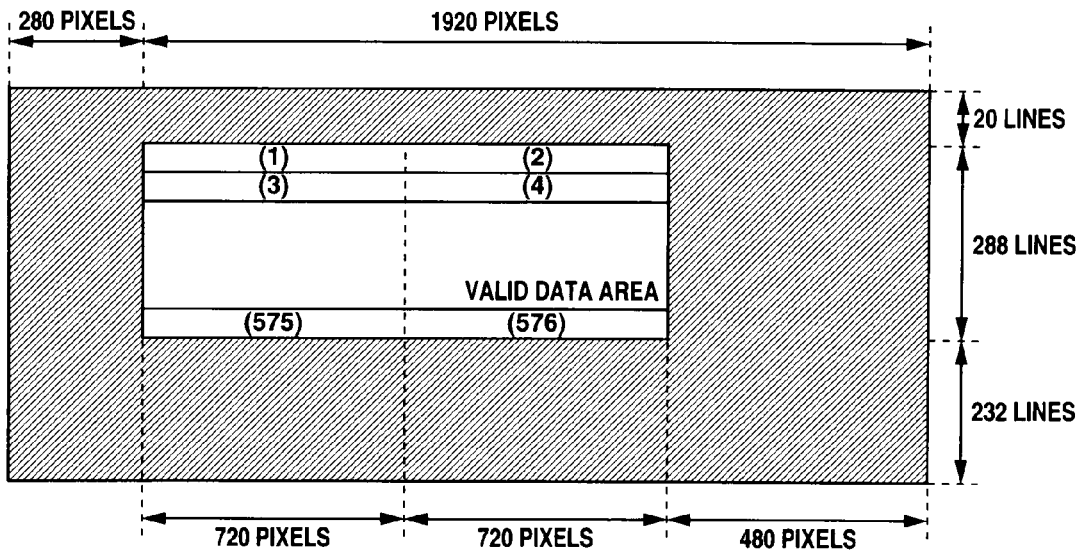
FIG. 24 is an explanatory diagram of the transmission data represented corresponding to the screen display in a first variation.

FIG. 23 is an explanatory diagram showing storage of video data in 720×576p into the memory. Moreover, FIG. 24 is an explanatory diagram of the transmission data represented corresponding to the screen display in the first variation. Since the video data in 720×576p is transmitted by using the transmission format of 1920×1080i, 1440 pixels, instead of 720 pixels, which correspond to two lines of 720 pixels are handled as one unit, that is, one line, in the readout from the transmitter memory by the video data input I/F section 34 in the data transmitting module 11.

As described above, the video data generating section 36 arranges data in the valid data area of the video data in 720×576p, on the transmission format of 1920×1080i. In such a case, the effective valid data area size calculating section 32 outputs the effective valid data area size information used for arranging the effective valid data area somewhere in the middle of the lines of the valid data area on the transmission format. Thereby, the data in the valid data area of the video data in 720×576p is arranged at a center position within the valid data area on the transmission format as shown in FIG. 24.

Figure 25:
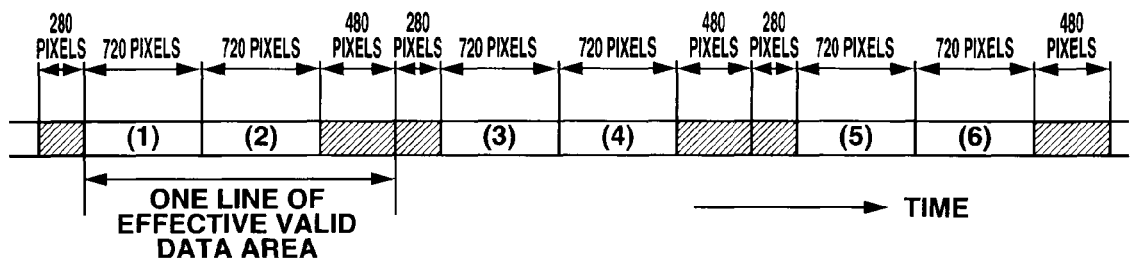
FIG. 25 is a timing chart showing the video data outputted from a video data generating section 36 in the first variation.

FIG. 25 is a timing chart showing the video data outputted from the video data generating section 36 in such a case. 720×576 pixels are changed to be arranged as 1440×288 pixels, and thereby, the video data in 720×576p is assigned to the transmission format of 1920×1080i.

In the data receiving modules 12 and 12', the received data is stored, for example, in the receiver memory as shown in FIG. 23, similarly to the transmitter, and thereby, the received data can be reproduced as being in the video format of 720×576p. It should be noted that, in FIG. 23, the video data is stored in the consecutive areas in the receiver memory. The consecutive areas provide the merit of the easier data access to the receiver memory. However, the consecutive areas are merely an example in every respect, and are not necessarily required.

Figure 26:
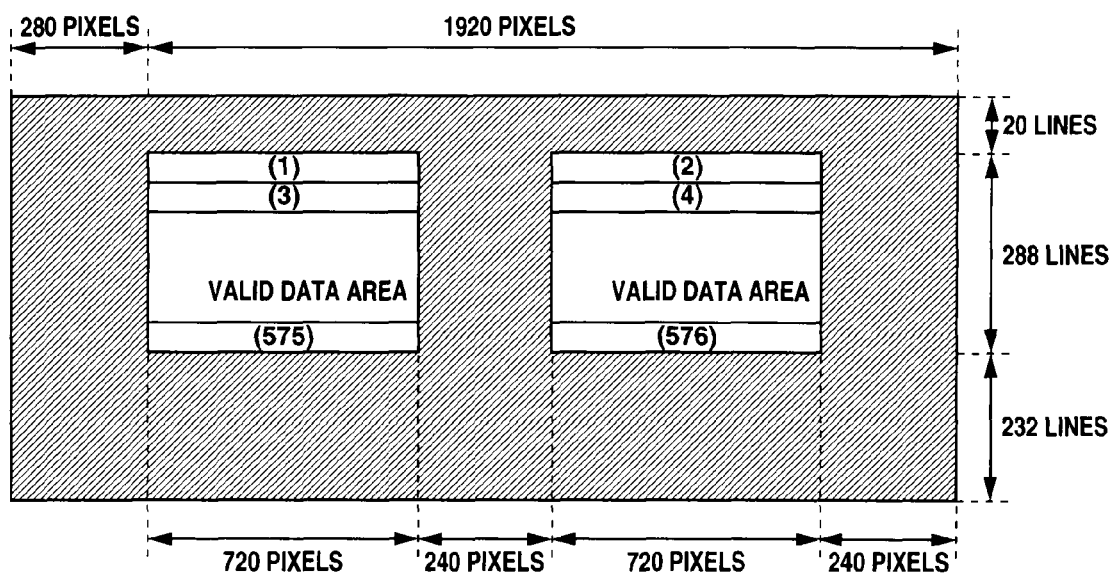
FIG. 26 is an explanatory diagram of the transmission data represented corresponding to the screen display in a second variation.
Figure 27:
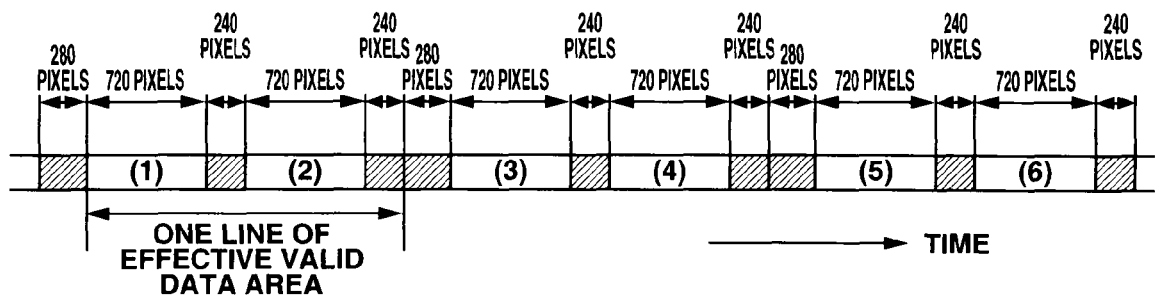
FIG. 27 is a timing chart showing the video data outputted from the video data generating section 36 in the second variation.

FIGS. 26 and 27 are diagrams showing a second variation. The second variation shows an example in which the effective valid data area is divided according to the effective valid data area size information from the effective valid data area size calculating section 32 of FIG. 11. The effective valid data area size information can handle such a plurality of effective valid data areas. FIG. 26 is an explanatory diagram of the transmission data represented corresponding to the screen display in the second variation.

Also in the second variation, the example in which the data in the video format of 720×576p is transmitted in the transmission format of 1920×1080i will be described. The storage of the video data in 720×576p into the transmitter memory and the readout of the video data in 720×576p from the transmitter memory by the video data input I/F section 34 are similar to the first variation.

The video data generating section 36 arranges the data in the valid data area of the video data in 720×576p, on the transmission format of 1920×1080i, based on the effective valid data area size information. In such a case, the effective valid data area size calculating section 32 outputs the effective valid data area size information used for dividing and arranging the effective valid data area within the valid data area on the transmission format. Thereby, the data in the valid data area of the video data in 720×576p is divided and arranged within the valid data area on the transmission format as shown in FIG. 26.

FIG. 27 is a timing chart showing the video data outputted from the video data generating section 36 in such a case. The 720×576 pixels are divided into two 720×288 pixel areas and arranged, and thereby, the video data in 720×576p is assigned to the transmission format of 1920×1080i.

In the data receiving modules 12 and 12', the received data is stored, for example, in the receiver memory as shown in FIG. 23, similarly to the transmitter, and thereby, the received data can be reproduced as being in the video format of 720×576p. It should be noted that, in FIG. 23, the video data is stored in the consecutive areas in the receiver memory. The consecutive areas provide the merit of the easier data access to the receiver memory. However, the consecutive areas are merely an example in every respect, and are not necessarily required.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A video data transmitting and receiving apparatus, comprising:
a data transmitting module configured to be able to arrange video data in a first video format, into a valid data area of a first transmission format, and transmit the video data, and also to arrange video data in a second video format different from the first video format, into an effective valid data area within the valid data area of the first transmission format, and transmit the video data; and
a data receiving module configured to receive the data transmitted in the first transmission format from the data transmitting module, and obtain the video data in the second video format within the valid data area.

2. The video data transmitting and receiving apparatus according to claim 1, wherein:
the data transmitting module arranges information on the effective valid data area into a blanking area of the first transmission format, and transmits the information on the effective valid data area.

3. The video data transmitting and receiving apparatus according to claim 1, wherein:
the data transmitting module comprises:
an effective valid data area size calculating section configured to calculate the effective valid data area based on the second video format and the first transmission format; and
a video data generating section configured to arrange the video data in the second video format, onto the first transmission format based on the calculated effective valid data area, and transmit the video data.

4. The video data transmitting and receiving apparatus according to claim 3, wherein:

the effective valid data area size calculating section comprises:
a video format size calculating section configured to calculate an input valid data area size of the second video format;
a valid data area size calculating section configured to calculate a transmission valid data area size of the first transmission format;
a valid data area size converting section configured to calculate a converted valid data area size which is an effective size of the valid data area in a case where the video data in the second video format has been arranged into the valid data area of the first transmission format, based on the input valid data area size and the transmission valid data area size; and
a selecting section configured to compare the number of vertical pixels of the input valid data area size with the number of vertical pixels of the transmission valid data area size, and if the input valid data area size is smaller than the transmission valid data area size, select the input valid data area size as the effective valid data area, and if the input valid data area size is larger than the transmission valid data area size, select the converted valid data area size as the effective valid data area.

5. The video data transmitting and receiving apparatus according to claim 4, wherein:
the data receiving module obtains the video data in the second video format which has been arranged into the effective valid data area, based on information on the transmission valid data area.

6. The video data transmitting and receiving apparatus according to claim 5, wherein:
the data receiving module obtains the information on the transmission valid data area from the data in the first transmission format transmitted from the transmitting module.

7. The video data transmitting and receiving apparatus according to claim 5, wherein:
the data receiving module comprises:
a synchronization detecting section configured to obtain information on a pixel position of each pixel of the video data in the second video format based on information regarding the first transmission format, and
the data receiving module obtains the video data in the second video format which has been arranged into the effective valid data area, based on the information on the transmission valid data area and the information on the pixel position of the video data in the second video format.

8. The video data transmitting and receiving apparatus according to claim 3, wherein:
if each pixel of the video data in the second video format is a pixel within the effective valid data area obtained by the effective valid data area size calculating section, the video data generating section selects and outputs the video data in the second video format, and if each pixel of the video data in the second video format is not the pixel within the effective valid data area, the video data generating section selects and outputs blanking data.

9. The video data transmitting and receiving apparatus according to claim 1, wherein:
information on the effective valid data area is information for a plurality of the effective valid data areas.

10. The video data transmitting and receiving apparatus according to claim 1, wherein:

the data receiving module obtains the video data in the second video format which has been arranged into the effective valid data area, based on information on the effective valid data area.

11. The video data transmitting and receiving apparatus according to claim 10, wherein:
the data transmitting module arranges the information on the effective valid data area into a blanking area of the first transmission format, and transmits the information on the effective valid data area.

12. The video data transmitting and receiving apparatus according to claim 1, wherein:
the data receiving module comprises:
a synchronization detecting section configured to obtain information on a pixel position of each pixel of the video data in the second video format based on information regarding the first transmission format, and
the data receiving module obtains the video data in the second video format which has been arranged into the effective valid data area, based on information on the effective valid data area and the information on the pixel position of the video data in the second video format.

13. The video data transmitting and receiving apparatus according to claim 1, wherein:
the data transmitting module arranges the video data in the second video format, at an end section within the valid data area of the first transmission format, and transmits the video data.

14. The video data transmitting and receiving apparatus according to claim 1, wherein:
the data transmitting module arranges the video data in the second video format, at a center within the valid data area of the first transmission format, and transmits the video data.

15. The video data transmitting and receiving apparatus according to claim 1, wherein:
the data transmitting module divides and arranges the video data in the second video format, within the valid data area of the first transmission format, and transmits the video data.

16. A video data transmitting and receiving method, comprising:
arranging video data in a first video format, into a valid data area of a first transmission format, and transmitting the video data, and also arranging video data in a second video format different from the first video format, into an effective valid data area within the valid data area of the first transmission format, and transmitting the video data, by a data transmitting module; and
receiving the data transmitted in the first transmission format from the data transmitting module, and obtaining the video data in the second video format within the valid data area, by a data receiving module.

17. The video data transmitting and receiving method according to claim 16, wherein:
the data transmitting module arranges information on the effective valid data area into a blanking area of the first transmission format, and transmits the information on the effective valid data area.

18. The video data transmitting and receiving method according to claim 16, wherein:
the data receiving module obtains information on the transmission valid data area from the data in the first transmission format transmitted from the transmitting module.

* * * * *